July 3, 1951
R. BOURGET
2,559,393
POWER TRANSMISSION
Filed March 5, 1947
4 Sheets-Sheet 1
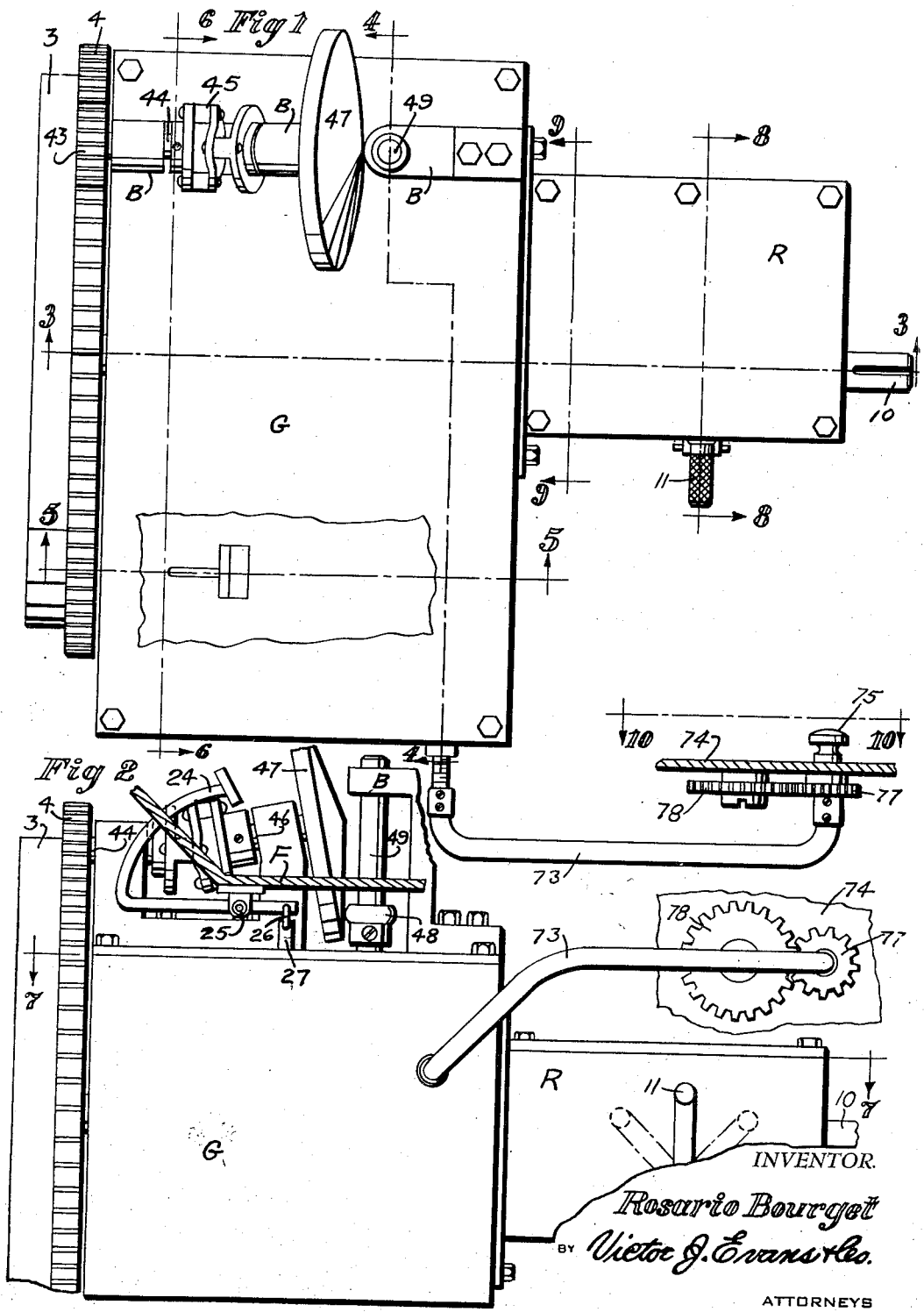
INVENTOR.
Rosario Bourget
BY Victor J. Evans & Co.
ATTORNEYS July 3, 1951 R. BOURGET 2,559,393
POWER TRANSMISSION
Filed March 5, 1947 4 Sheets-Sheet 2

INVENTOR.
Rosario Bourget
BY Victor J. Evans & Co.
ATTORNEYS

July 3, 1951
R. BOURGET
2,559,393
POWER TRANSMISSION
Filed March 5, 1947
4 Sheets-Sheet 4
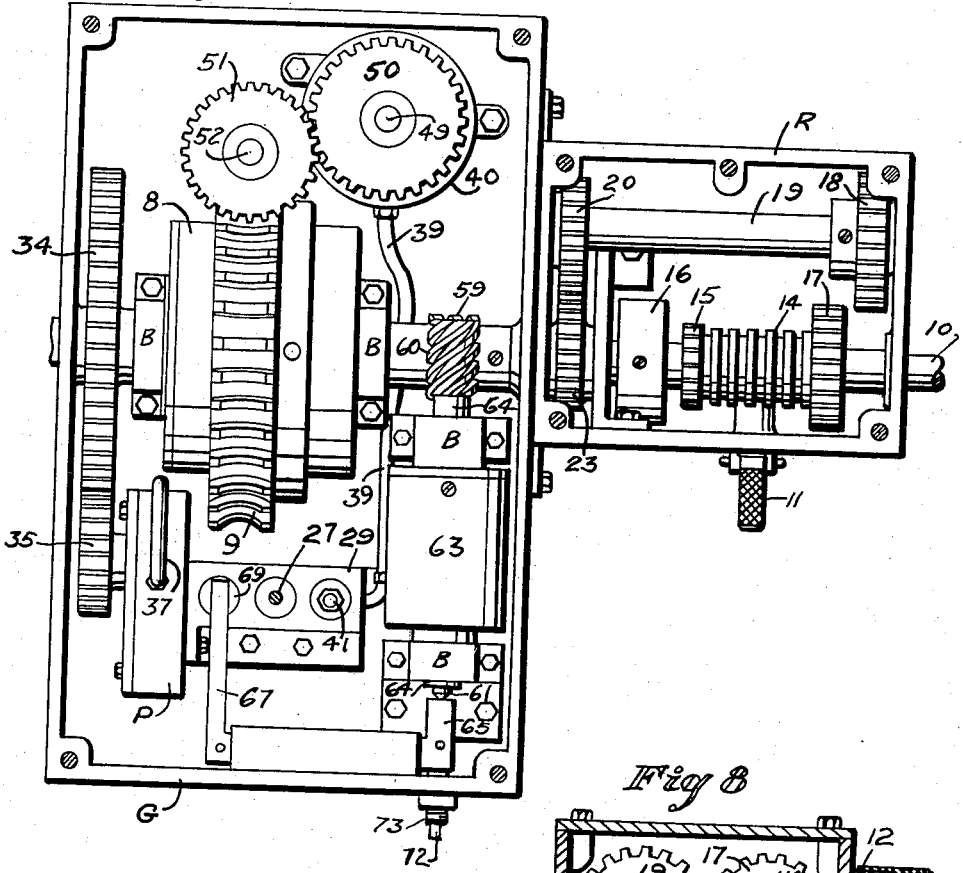
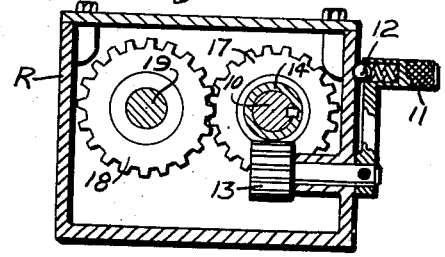
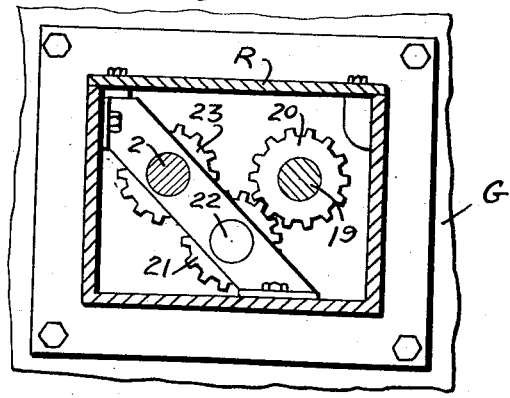
INVENTOR.
*Rosario Bourget*
BY *Victor J. Evans & Co.*
ATTORNEYS July 3, 1951  R. BOURGET  2,559,393
POWER TRANSMISSION
Filed March 5, 1947  4 Sheets-Sheet 3
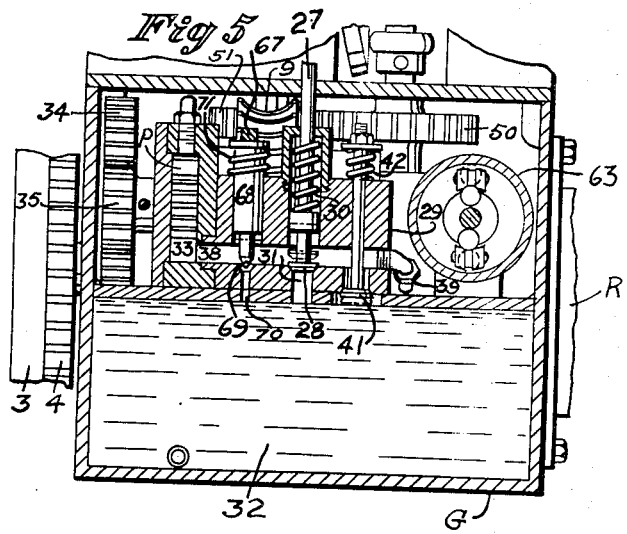
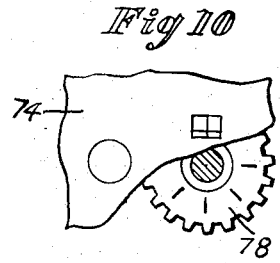
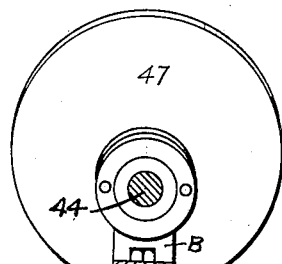
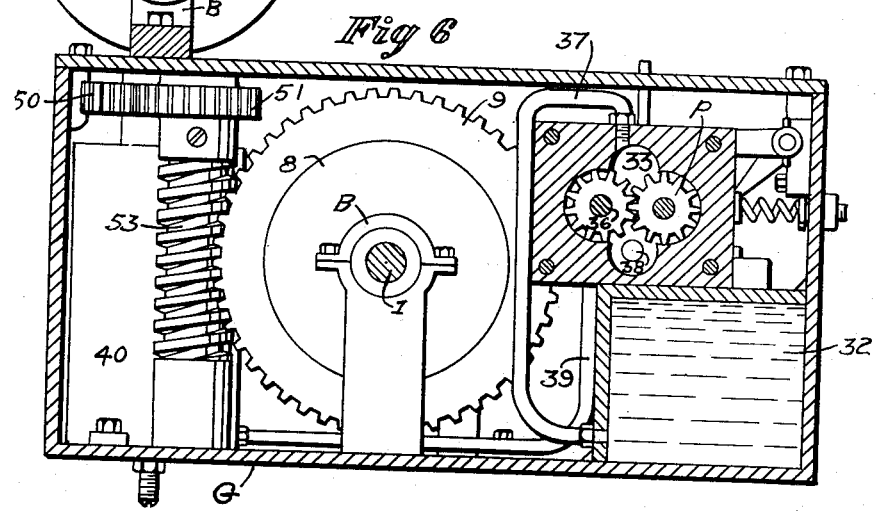
INVENTOR.
Rosario Bourget
BY Victor J. Evans & Co.
ATTORNEYS Patented July 3, 1951

2,559,393

UNITED STATES PATENT OFFICE 2,559,393

POWER TRANSMISSION

Rosario Bourget, St. Vincent de Paul, Quebec, Canada

Application March 5, 1947, Serial No. 732,611

1 Claim. (Cl. 74—691)

My present invention relates to the general class of rotary power transmission mechanism, and more particularly to an improved power transmission for use in the propulsion of automotive vehicles, or for installation with shop machinery of the type utilizing variable operating speeds. As here illustrated and herein described the power transmission mechanism is designed for use with an automotive vehicle, and it includes a motor operated sectional differential power shaft having an axially power take-off section equipped with manually controlled reversing mechanism, together with compactly arranged interchangeable gearing for variable speed transmission. A variable speed friction clutch under hydraulic controlling mechanism is utilized in connection with high speed transmission; and a centrifugally operated speed-responsive governor, under manual control, is employed with the hydraulic mechanism in varying the transmission of power through the power shaft. A starting and vehicle-operating pedal-actuated mechanism is employed for controlling the automotive vehicle through the hydraulic mechanism, and the vehicle may with facility be effectively operated with smoothness and precision.

In the accompanying drawings I have illustrated one complete example of the physical embodiment of my power transmission mechanism in which parts are combined and arranged in accord with one mode I have devised for the practical application of the principles of my invention, but it will be understood that changes and alterations may be made in these exemplifying drawings, within the scope of my appended claim, without departing from the principles of the invention.

Figure 1 is a plan view showing the general assembly parts of the transmission mechanism; and Figure 2 is a side view in elevation, showing especially the pedal control mechanism.

Figure 5 is a vertical longitudinal sectional view at line 5—5 of Fig. 1; and Figure 6 is a vertical longitudinal sectional view at line 6—6 of Fig. 1.

Figure 7 is a top plan view, as at line 7—7 of Fig. 2; and Figure 8 is a transverse veritcal sectional view at line 8—8 of Fig. 1 through the reversing gear box.

Figure 9 is another sectional view at line 9—9 of Fig. 1 through the reversing gear box; and Figure 10 is a detail view of the indicator for speeds under control of the speed-responsive governor mechanism.

In the general assembly views showing the transmission equipment for an automotive vehicle, or car according to my invention, the usual main gear box G having the reversing gear box or casing R bolted against the outer face of one end of the main gear box, is provided with an interior rotary oil pump P.

The main power transmission shaft, which extends longitudinally of the vehicle, comprises a driving section 1 and a driven section 2, the former section receiving power from a suitable power plant or motor, and the sections are journaled in bearings in the spaced walls of the main gear box.

Figure 3:
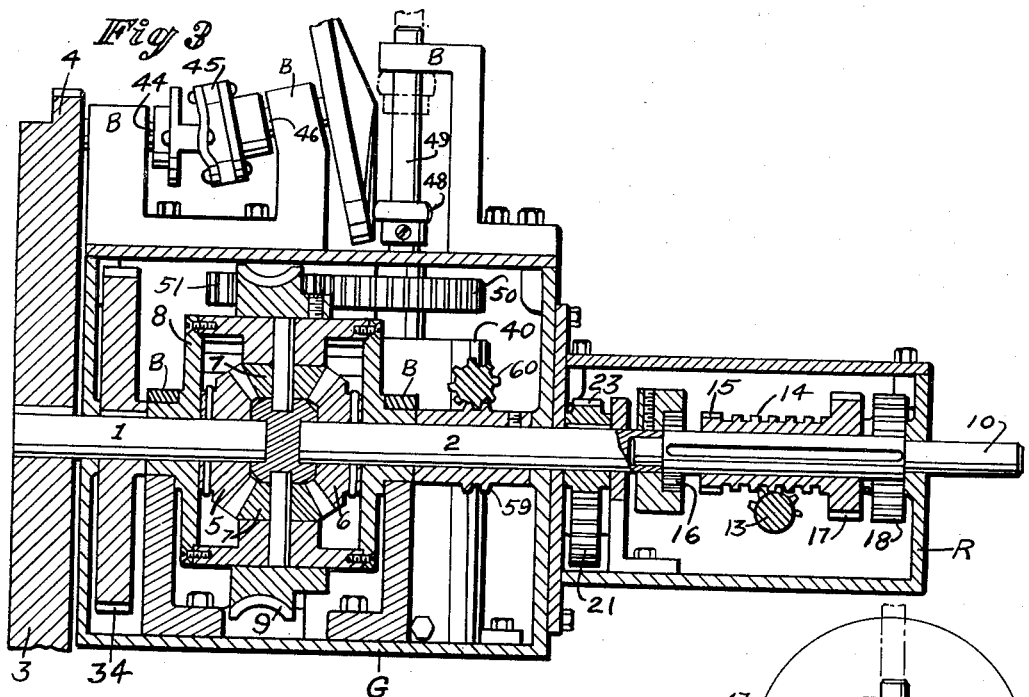
Figure 3 is a longitudinal vertical sectional view as at line 3—3 of Fig. 1.

The drive section of the power shaft is equipped with a conventional flywheel or balance wheel 3 which is provided with an external gear ring or drive gear 4; and as best seen in Fig. 3, the two sections of the main power shaft are united by a universal coupling or planetary gearing or universal gearing of the differential type. The differential coupling includes a bevel drive gear 5 on the drive section of the main shaft and a driven gear 6 on the driven shaft, together with four conventional pinions 7, mounted within the coupling frame 8, which is provided with bearings for the pinion shafts; and an external worm gear 9 is mounted upon the exterior of the coupling.

In Fig. 2, the reversing shaft 10, which is axially alined with the differential power shaft and provided with a socket connection thereto, is journaled in suitable bearings in the wall of the reverse gear box R, and in bearings B, which letter B is employed throughout the drawings for bearings of other operating parts.

The reversing mechanism within the gear box R is under manual control of a hand crank 11, shown in Figs. 1, 2 and 8 as mounted exterior of the gear box, and adapted to be turned in Figs. 2 and 7 from the central neutral position to the right for reverse, and to the left for forward drive, and a spring detent 12 is shown in Fig. 8 for resiliently holding the crank in set position.

The crank is provided with a segmental or arcuate pinion 13 that constantly meshes with an externally threaded slide sleeve or roller 14 which is keyed on and rotates with the reversing shaft 10, and at one end the sleeve is equipped with an external gear 15 that is adapted to slide into engagement with a complementary internal gear 16 rigidly fixed upon the intermediate shaft section 2, for forward direct drive.

For a reverse drive the threaded slide sleeve 14 is provided with a larger end gear 17 that is adapted to slide into engagement with a gear 18 mounted upon the countershaft 19, which is journaled in the reverse gear box, and shaft 19 is equipped with a spaced gear 20 that meshes with an idler gear 21 on a stub shaft 22, and the idler 21 is in constant mesh with gear 23 on the intermediate shaft 2.

When the equipment is installed as the transmission mechanism for an automotive vehicle, a starting and control pedal 24, in Fig. 2, is utilized, which is pivoted at 25 on the foot board F in position for ready access of the driver of the vehicle or car. The pedal is coupled at 26 to the upright stem 27 of a vertically arranged oil supply valve 28 which is reciprocably mounted in an interior valve casing 29 and depressed by spring 30 to close port 31 from the oil tank 32 located within the bottom portion of the gear box G.

The pedal 24 is used only when the motor is set in motion, with the lever 11 in forward or backward position, and it is depressed to stop the car. Depression of the pedal opens the valve and permits return of oil to the tank instead of passing through the cylinder. When the pedal is released the spring automatically closes the valve to cut off flow of oil from the tank into the valve casing.

The valve casing is supplied with oil by a positive rotary pump 33 (Fig. 6) within the casing P and which is located on top of the tank 32 and operated from section 1 of the power shaft through gear 34, and pinion 35 on pump shaft 36. The pump is connected by pipe 37 to the lower portion of the tank and also connected to the valve casing by port 38 in Figs. 5, 6.

From the valve casing oil is supplied through pipe 39 to the hydraulic cylinder 40 located in one corner of the gear box G, and for the hydraulic pressure mechanism within the cylinder a predetermined maximum degree is maintained by a control valve 41 (Fig. 5) which is lifted to closed position by its spring 42 to regulate the pressure applied to the oil in the tank.

The hydraulic control mechanism operating within the cylinder 40 is employed in connection with a high ratio direct drive from the wheel 4 to the worm wheel 9 of the differential coupling members of the sections of the power shaft, which control is utilized until the drive shaft attains the speed of the motor shaft, or the equivalent of third or maximum high speed, after which the hydraulic control becomes ineffective.

This drive in the transmission is accomplished from the flywheel or its gear ring 4 through mechanism mounted partially within and partially without the gear box G, and the exterior gearing includes a small pinion 43 on stud shaft 44 that is journaled in bearings B, B mounted on the exterior top of the gear box. By means of a flexible or universal coupling 45 shaft 44 is connected with a second stud shaft 46 upon which a conical friction disk 47 is rigidly mounted.

The driving disk 47 is mounted in upright position with its friction face in the path of a smaller friction wheel 48, preferably provided with an elastic or rubber friction face, and designed to co-act with the lower portion of the conical face of the driving disk. The small friction wheel 48 is designed to revolve with an upright vertically reciprocable shaft 49 that is slidably mounted in bearings B, B of the gear box, and the shaft may be lifted by hydraulic pressure within the cylinder to carry the small friction wheel 48 in operative relative to the driving disk up to its apex, and beyond the apex the wheel 48 becomes inoperative or ineffective, as indicated by dotted lines in Fig. 3.

Within the interior of the gear box G the vertically reciprocable and rotatable shaft 49 is equipped with a non-traveling gear 50 that is splined to slide on and rotate with the shaft. The gear 50 meshes with a complementary gear 51 mounted to revolve with a vertical shaft 52 journaled in bearings of the gear box, and the shaft 52 is equipped with a worm 53 that constantly engages the worm gear 9 of the differential coupling between the shaft sections 1 and 2. The angle of the teeth of the worm 53 and gear 9 that meshes with the worm 53 is such that the gears are self-locking whereby with the worm 53 stationary the gear 59 is locked preventing the outer section of the differential housing turning.

Figure 4:
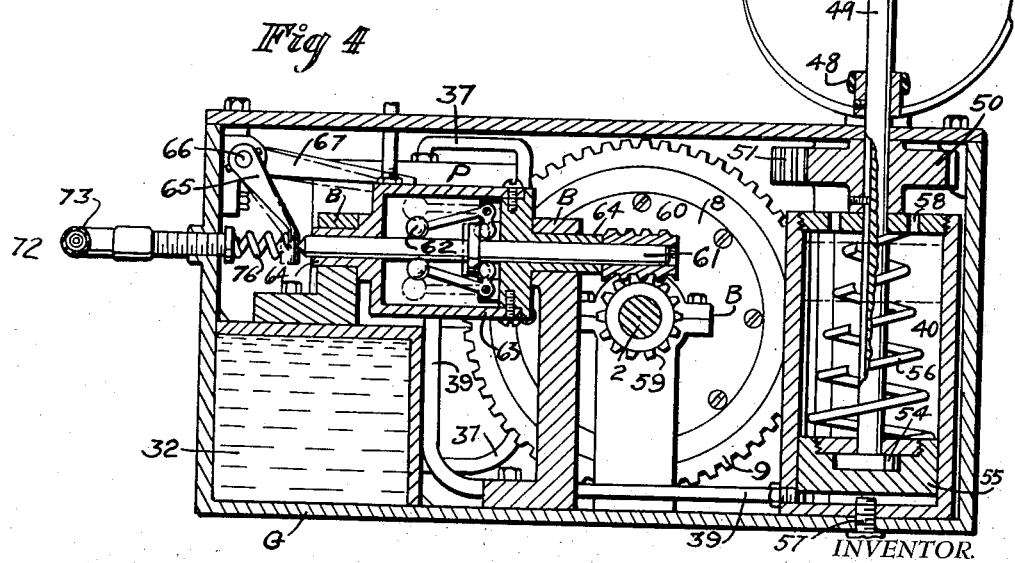
Figure 4 is a vertical transverse sectional view at line 4—4 of Fig. 1.

The vertically reciprocable control shaft and the frictionally driven wheel 48 rotatable therewith and fixed thereon are hydraulically lifted or elevated for coaction with the driving disk at varying speeds, and the shaft with its wheel is lowered by a spring device within the cylinder. For this purpose, and as best seen in Fig. 4, the shaft is extended downwardly through the cylinder 40, and its lower end is equipped with an enlarged bearing head 54 that is rotatably mounted in a piston head 55, and a spring 56 coiled about the stem or shaft 49 is interposed between the head of the cylinder and the piston head.

A screw plug 57 is threaded in the lower head of the cylinder as a stop for the piston and to maintain the necessary clearance for flow of oil under pressure from the pipe 39, and the upper end of the cylinder is vented at 58 to permit rise and fall of the level of the fluid pressure within the cylinder.

If desired, ball bearings may be interposed between the bearing head 54 of the rotary shaft 49 and the piston head 55, and the screw plug 57 may be adjusted to limit the descent of the shaft 49 and its friction wheel 48 that rotates therewith.

Hydraulic pressure is developed by the oil pump 33, the oil pump being operated by gearing which is driven by the shaft section 1. Initially, the control pedal 24 is depressed to open the valve 28, and a high-speed transmission can be obtained under control of the variable friction disc 47—48. Thus, after the wheel 48 rises beyond the apex of the cone disc, transmission of power to worm 53 and worm wheel 9 ceases. Thus, the disc 47 idles until the vehicle loses velocity, at which time the hydraulic pressure is reduced in the cylinder 40, to thereby permit the wheel 48 to descend into coaction with its driving disc for again transmitting power.

For manual adjustment, and automatic control of the flow of oil under pressure from the tank to the cylinder 40, a centrifugal governor responsive to the speed of the vehicle is actuated from the section 2 of the power shaft (Fig. 3) through a helical drive gear 59, which meshes with worm 60 located at the end of a horizontally disposed governor shaft 61.

The governor shaft, which is journaled in bearings B, B, extends transversely of the power shaft, and it is longitudinally slidable under action of the centrifugal ball-governor 62 responsive to the speed of the power shaft. The ball-governor is enclosed within a casing 63 having tubular bearing trunnions 64 in which the governor shaft is slidably mounted, and the end of the governor shaft contacts constantly against and co-acts with one arm 65 of a crank lever which is pivoted at 66 in a bracket mounted on the inner face of the gear box wall. The other arm 67 of the pivoted crank lever bears down upon the upper end of a valve stem 68 vertically mounted to reciprocate in valve casing 29, and a valve 69 on the lower end of the stem is adapted to close the port 70 of the tank against tension of a spring 71 that tends to open the port.

Valve 69 may be adjusted in operative positions that will permit oil coming from the pump to return in part to the tank by way of port 70 when the motor is gradually accelerated, thereby leaving a reduced oil pressure to act on piston 55 when valve 28 is closed by releasing pedal 24; thereafter valve 69 gradually closes under action of the ball governor as the car accelerates.

For manual adjustment of the action of the governor and control of the transmission in direct connection with the motor at low speeds from ten to thirty miles per hour, a flexible shaft 72, which is enclosed in a tubular housing 73, is extended from the gear box G to the instrument board 74, or other suitable location on the motor vehicle. By means of an adjusting button or knob 75 attached to one end of the shaft, the latter may be operated to extend or retract and vary the tension of a spring 76 that bears against the crank arm 65 and thus regulate the action of the governor. The miles per hour may be indicated to the driver of the vehicle by means of a pinion 77 of the flexible shaft and a rotary gear disk 78 actuated thereby, which latter gear is marked or graduated as indicated in Fig. 10 for that purpose.

Having thus fully described my invention, what I claim as new and desire to secure by Letters Patent is:

In a hydraulic mechanism for controlling a variable speed drive of the disc and wheel type in power transmission mechanism for a motor-operated vehicle, the combination with a main gear box, a casing secured to said main gear box, a rotary oil pump positioned in said casing, a main power transmission shaft comprising a driving section adapted to be connected to a power source, a driven section, a planetary gearing connecting said driven section to said drive section, a fly wheel mounted on said driving section provided with an external gear ring, an oil tank and valve casing positioned in said gear box, a valve in said valve casing for controlling the flow of oil from said oil tank, said tank being supplied with oil by said pump and said pump being operated by said driving section, a hydraulic cylinder positioned in a corner of said gear box and connected to said valve casing, a first stud shaft journaled on the top of said gear box, a pinion on said first stud shaft meshing with the gear ring on said flywheel, a second stud shaft connected to said first stud shaft, a conical friction disc mounted on said second stud shaft, a vertically reciprocable shaft slidably mounted in said gear box, a friction wheel mounted on said reciprocable shaft for co-action with said friction disc, said reciprocable shaft adapted to be lifted by hydraulic pressure within the cylinder, gear means connecting said reciprocable shaft to said planetary gearing, a spring for normally urging the reciprocable shaft downwardly, and an adjustable governor for regulating fluid pressure in the cylinder.

ROSARIO BOURGET.

REFERENCES CITED

The following references are of record in the file of this patent:

UNITED STATES PATENTS

| Number | Name | Date |
|---|---|---|
| 548,860 | Ames | Oct. 29, 1895 |
| 1,062,128 | Swedlund | May 20, 1913 |
| 1,358,447 | Hupp | Nov. 9, 1920 |
| 1,493,932 | Gerstadt | May 13, 1924 |
| 1,496,123 | Jones | June 3, 1924 |
| 1,559,975 | Murray | Nov. 3, 1925 |
| 2,069,360 | Duffield | Feb. 2, 1937 |
| 2,203,546 | Pollard | June 4, 1940 |
| 2,225,408 | Berliner | Dec. 17, 1940 |